March 4, 1941.  T. R. JAMES  2,233,919
FOOD PROCESSING MACHINE
Filed Aug. 19, 1938  8 Sheets-Sheet 2

Fig. 2.

Inventor
Thomas R. James,
By Robert E. Sattler
Attorney

March 4, 1941.   T. R. JAMES   2,233,919
FOOD PROCESSING MACHINE
Filed Aug. 19, 1938   8 Sheets-Sheet 3
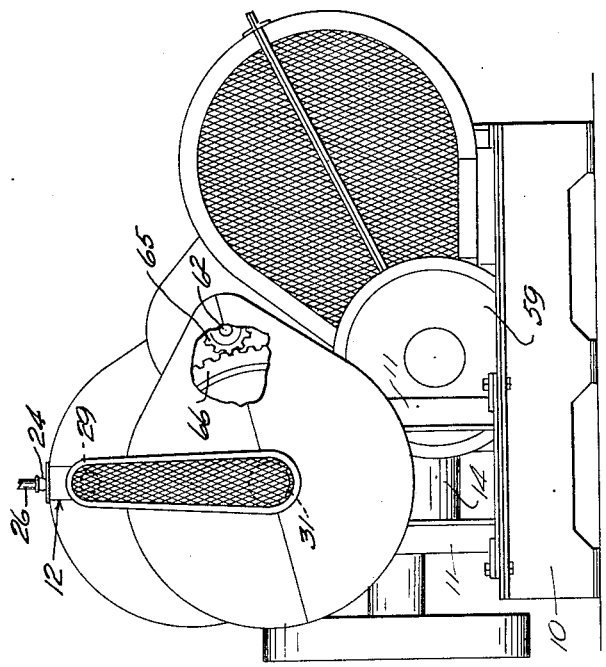
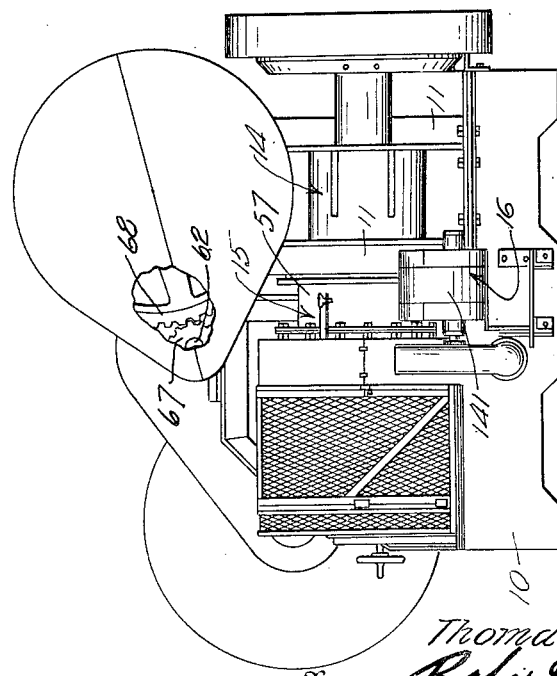
Inventor
Thomas R. James,
By Robert E. Sadtler
Attorney

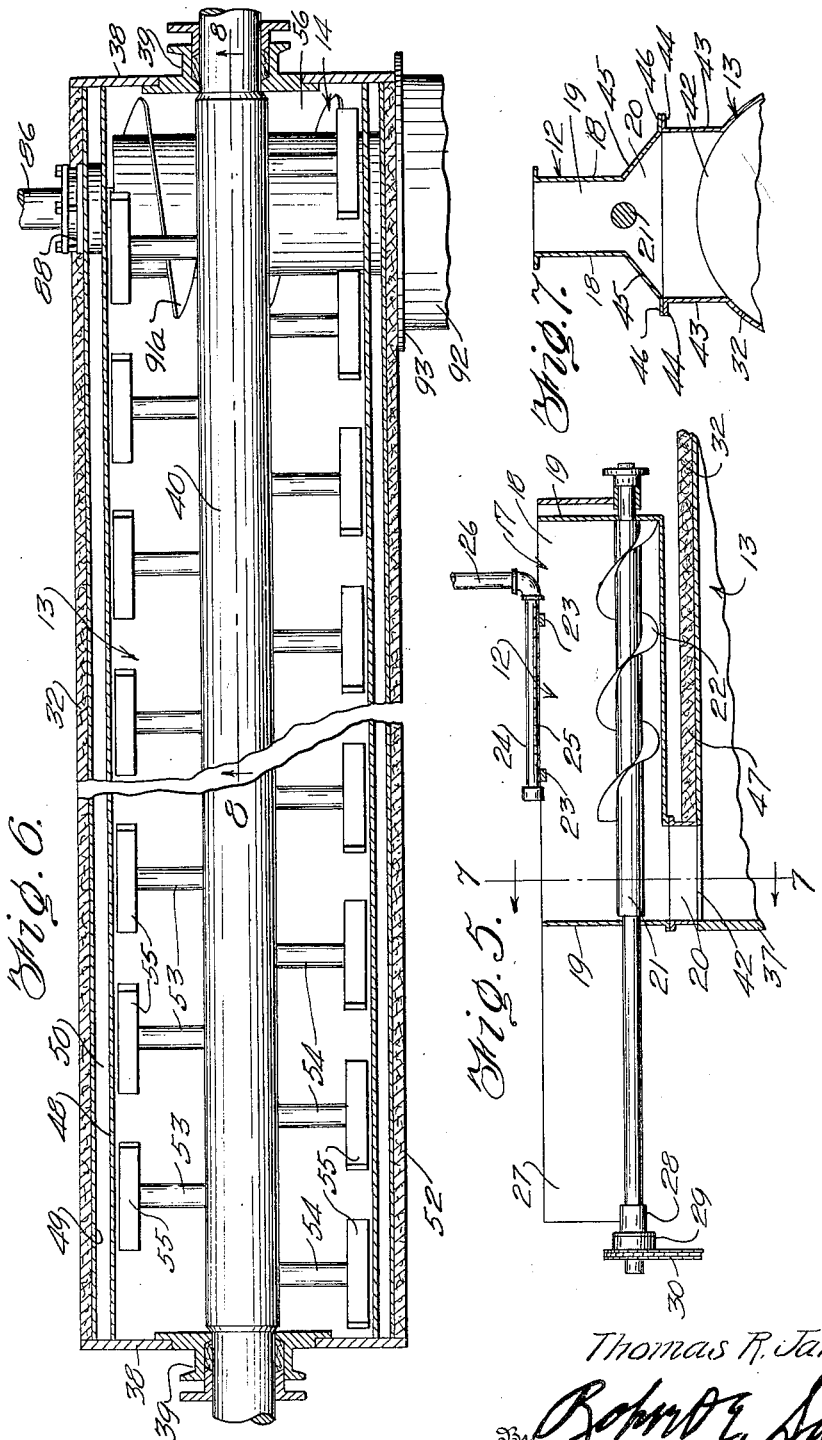

March 4, 1941. T. R. JAMES 2,233,919
FOOD PROCESSING MACHINE
Filed Aug. 19, 1938 8 Sheets-Sheet 5
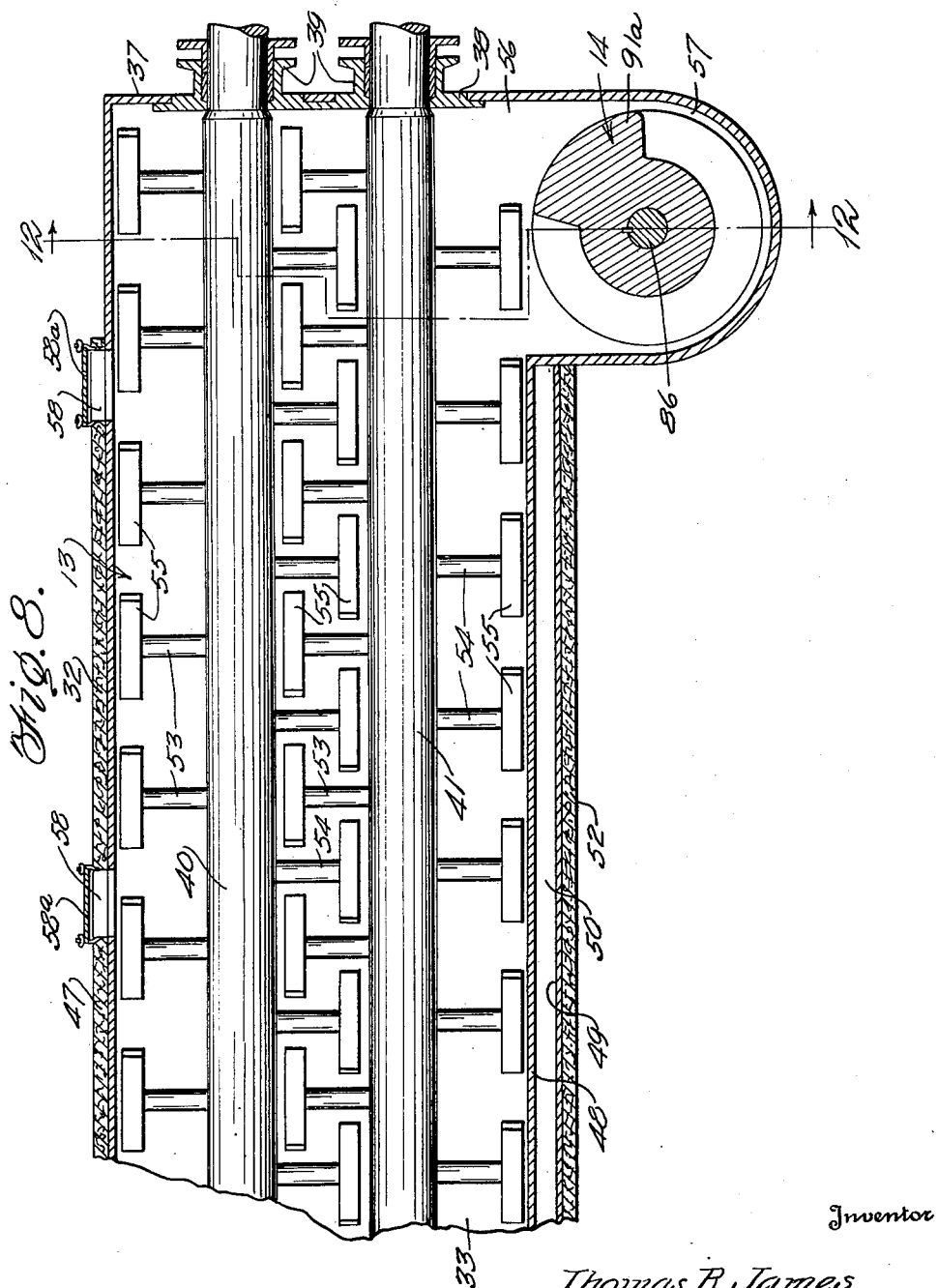
Inventor
Thomas R. James,
By Robert E. Sadtler
Attorney

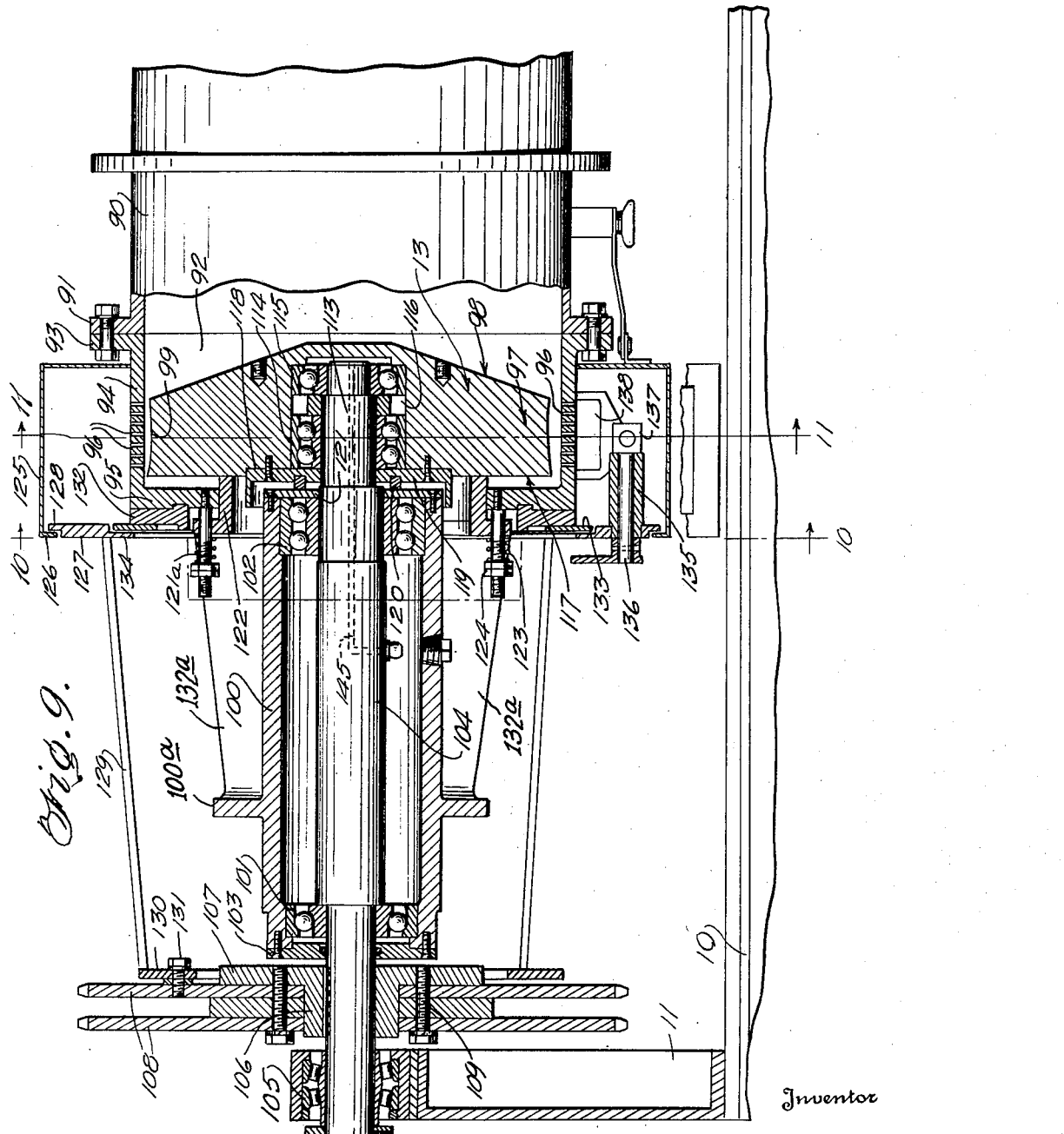

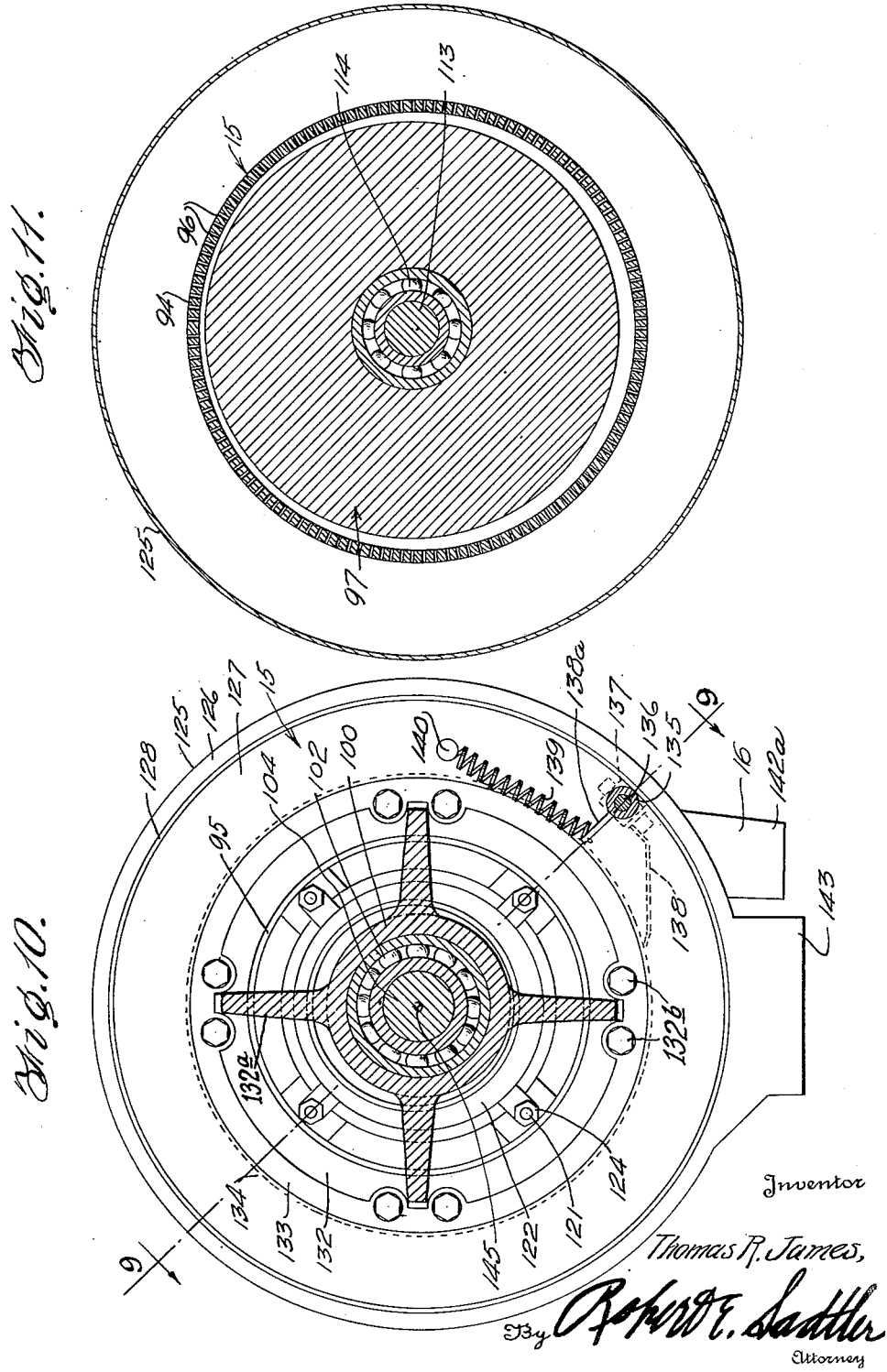

March 4, 1941.　　　T. R. JAMES　　　2,233,919
FOOD PROCESSING MACHINE
Filed Aug. 19, 1938　　　8 Sheets-Sheet 8
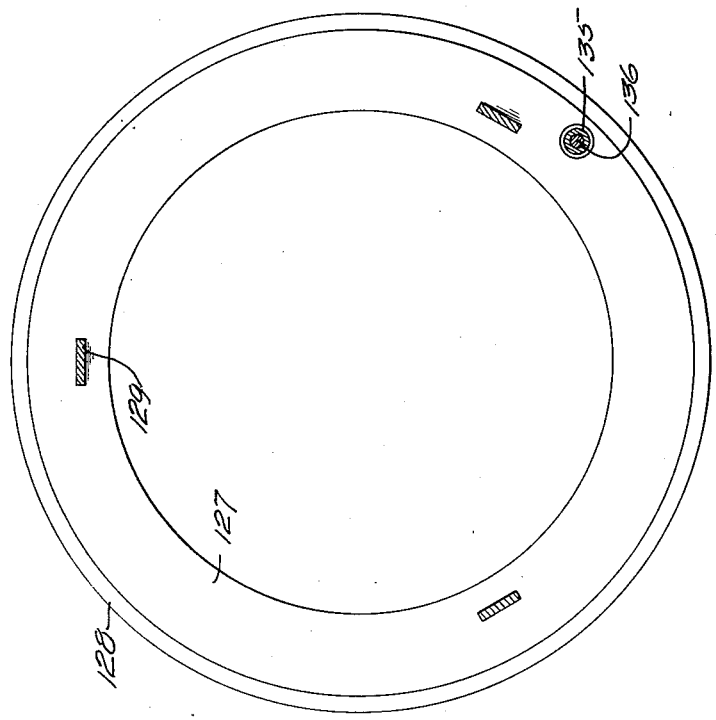
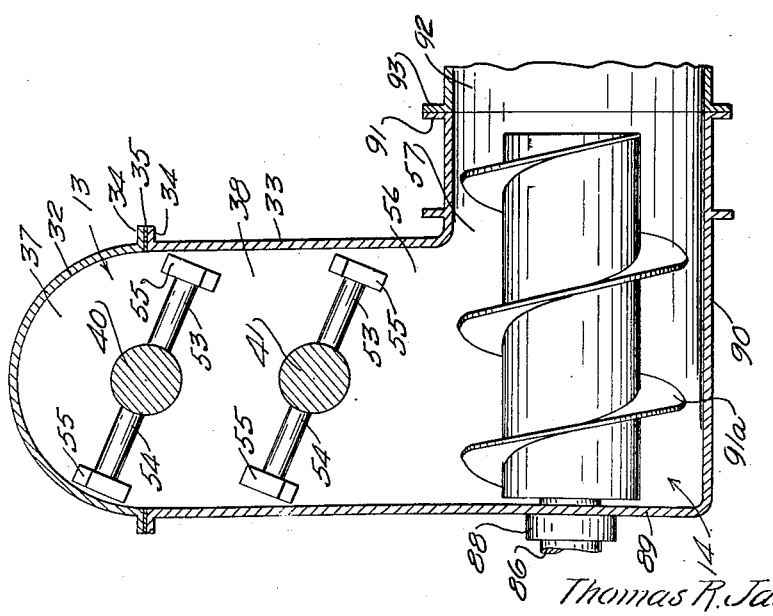
Inventor
Thomas R. James,
By Robert E. Sadtler
Attorney Patented Mar. 4, 1941

2,233,919

UNITED STATES PATENT OFFICE 2,233,919

FOOD PROCESSING MACHINE

Thomas R. James, Minneapolis, Minn., assignor to General Mills, Inc., a corporation of Delaware Application August 19, 1938, Serial No. 225,767

3 Claims. (Cl. 53—17)

This invention relates to food processing machines and has special reference to a machine for preparing cooked food in the form of pellets or short cylinders particularly for use in a puffing gun for making a puffed cereal.

An object of the invention is to provide a machine of this character wherein a continuous movement of the food under preparation will take place without any manual handling from the introduction of the ingredients into the machine to the production of the cooked pellets.

Another object of the invention is to provide a machine of this character wherein, from the time the food ingredients are introduced until the cooked pellets are produced there will be no exposure to external air, thus preventing general contamination from the air, the cooking operation serving to destroy any germs which may enter the machine during the feeding of the ingredients into the mixer.

Still another object of the invention is to provide a machine of this type having means for kneading, working and extruding a very tough viscous dough and for forming it into pellets of a desired size and shape.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 2 is a plan view of the machine.

Figure 3 is an end elevation of the machine, the view being taken from the right hand end of Figures 1 and 2.

Figure 4 is an end elevation of the machine, the view being taken from the left hand end of Figures 1 and 2.

Figure 5 is a vertical longitudinal section of the mixer mechanism of the invention, the view being taken to an enlarged scale.

Figure 6 is a view, partly in plan and partly in horizontal section, and discloses the cooker device to an enlarged scale.

Figure 7 is a fragmentary section on the line 7—7 of Figure 5.

Figure 8 is a fragmentary section on the line 8—8 of Figure 6.

Figure 9 is an enlarged detail section on the line 9—9 of Figure 2, the view showing details of the extruder unit.

Figure 10 is a view on the line 10—10 of Figure 9, and showing one end of the extruder unit.

Figure 11 is a section on the line 11—11 of Figure 9.

Figure 12 is a fragmentary detail section on the line 12—12 of Figure 8.

Figure 13 is a detail elevation, partly in section of a frame ring forming part of the device.

Figure 1:
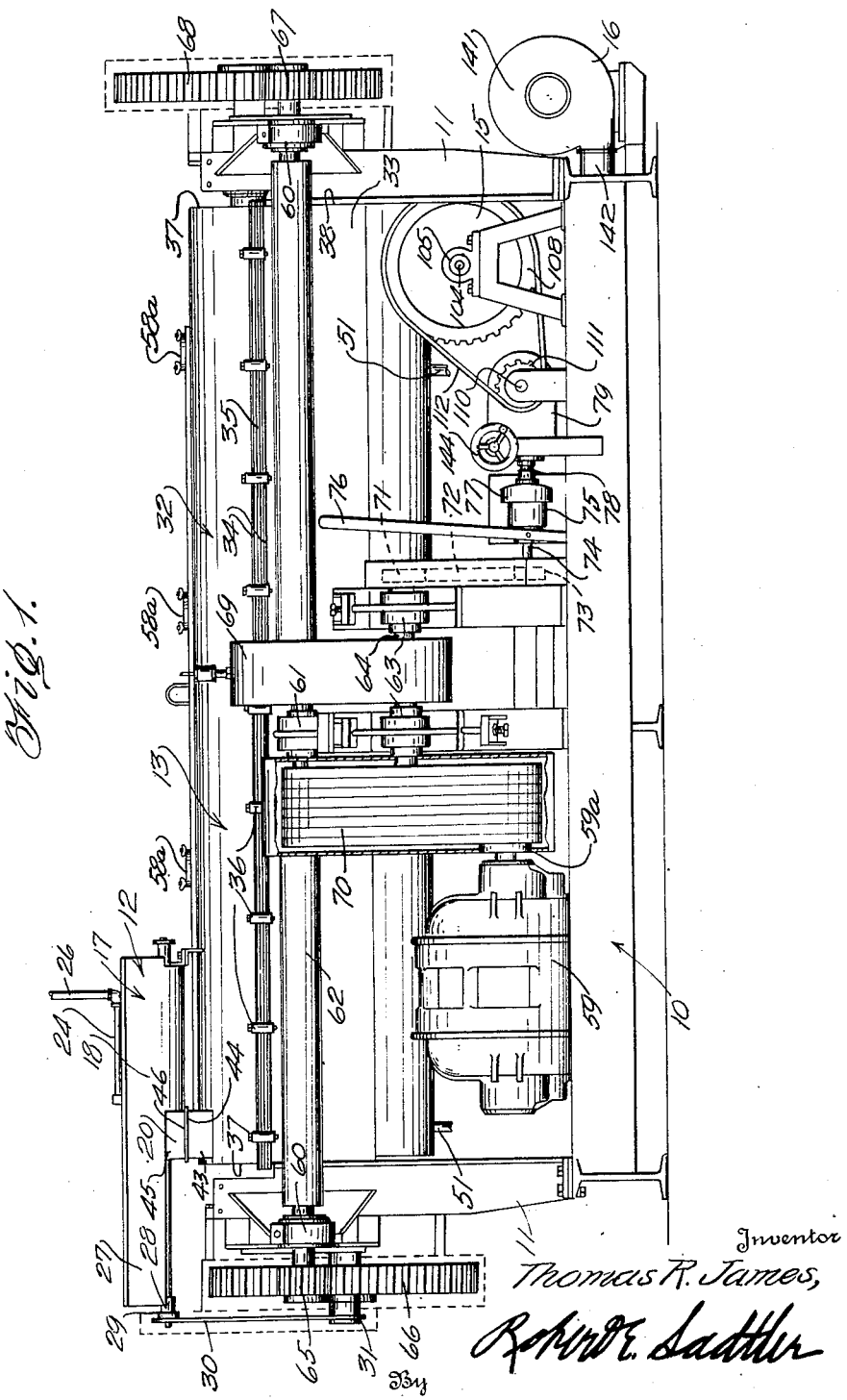
Figure 1 is a side elevation of the complete machine with certain of the guards for the moving part omitted.

In carrying out this invention as shown in the accompanying drawings there is provided a base frame 10, which supports the various mechanisms through upstanding frame members 11. Obviously the particular construction of this frame will depend on such factors as the size of its machine, its location, and other purely mechanical matters. Therefore, the details of construction of the frame will not be specifically described, it being deemed sufficient to state that the various mechanisms entering into the invention itself are suitably supported from the frame.

In general the invention comprises a mixer 12 for mixing the ingredients of the food under preparation with suitable liquid such as water, a cooker 13 also having the function of constituting a dough mixer during the cooking operation, a feed or screw unit 14, an extrusion device or unit 15, and a blower or cooling device 16, the latter serving to keep the pellets in motion while cooling to prevent them from sticking to each other and to the machine and to blow them out of the same.

Inasmuch as these devices act in the order named, on the food being prepared they will be described in that order.

The mixer 12 lies at the top of the machine and includes a troughlike vessel 17 having sides 18 and ends 19. Referring to the positions of the various elements as shown in Figures 1 and 2 it will be seen that this vessel 17 has in its bottom at the left end an opening 20, the trough 17 extending to the right from this opening. In the end walls 19 is journaled the shaft 21 having secured thereon a conveyor worm 22. This worm extends from the right end of the trough 17 to the opening 20. Across the trough and extending from one side wall to the other are supports 23, whereon rests a pipe 24 having separate openings 25 in its lower part. This pipe is connected to a feed pipe 26 which receives liquid from any suitable source such as a tank or the like, the source of liquid not being necessary here to be shown. It will be observed that the pipe 24 lies over and extends along the worm so that when the solid ingredients of the food are pressed in the trough by any suitable means and liquid flows from the pipe 24 the working of the worm will mix the liquid and solid ingredients and will feed these mixed ingredients to the opening 20. Extending from the left hand end of the trough 17 are brackets 27 which support a bearing 28 carrying the left hand end of the shaft 21. On this left hand end there is further provided a sprocket 29 which is connected by a chain 30 to a sprocket 31 driven in a manner which will presently be described.

The cooker 13 is composed of an upper section 32 and a lower section 33. The upper section is of inverted semicircular form in cross section, while the major part of the lower section is of U-shape in cross section, thus forming a trough. The sections 32 and 33 are provided with peripheral flanges 34 between which is a suitable gasket 35, Fig. 12, these sections being held together at intervals by holdfast means 36 of any suitable sort, which will provide for the removal of the upper section from the lower section when desired. The upper section 32 has end walls 37, and the lower section 33 has end walls 38. These end walls support two pairs of alined stuffing boxes 39, wherein are journaled an upper shaft 40 and a lower shaft 41, these shafts being parallel and having their axes concident with the centers of curvature of the upper and lower curved portions of the cooker. The sprocket 31 is mounted on the left hand end of the shaft 41, so that when this shaft is rotated the shaft 21 will likewise be rotated. At the left hand end of the cooker there is provided an opening 42 (Fig. 7) and a peripheral wall 43 projects upwardly around this opening and has a flange 44 projecting outwardly from its upper edge. The side walls 18 of the mixer have, at the opening 20, downwardly and outwardly flaring portions 45 provided with flanges 46 which rest on the flange 44. This construction permits the mixed material from the mixer to spread out as it passes out of the mixer, and the opening 42 permits the mixed material to flow into the cooker.

The upper section of the cooker is provided with a heat insulating jacket 47, and the lower section of the cooker is provided with an inner side wall 48 and an outer side wall 49 spaced concentrically from the wall 48 to form a steam-jacket space 50, into which nipples 51 lead from this steam space and serve for connection to a pipe for steam supply and to an exhaust pipe. By means of this arrangement the steam spacing may be heated to any desired degree. The steam space 50 is provided with an insulating jacket 52. Extending radially from each of the shafts 40 and 41 is a series of arms 53 and diametrically opposite the arms 53 but in staggered relation thereto is a second series of arms 54. Carried on the outer end of each of the arms 53 and 54 is a combined stirring and conveying member 55, which forms a T head on the arm. These T heads are set at an angle to the axis of the respective shafts and the angular relation is such that rotation of the shaft causes these heads 55 to force the material in the cooker toward the right. At its right hand end the lower member 33 is provided with an opening 56 which communicates with a cylindrical chamber 57, presently to be referred to. It will now be observed that the material passes from the mixer to the left hand end of the cooker, and then gradually moves to the right hand end of the cooker, this motion being affected by the rotating shafts and elements 55. During this movement through the cooker the heat of the steam in the space 50 will thoroughly cook the material and, at the same time, there will be a constant kneading of the mixture so that a mass of plastic material will be obtained in a thoroughly cooked condition, upon the arrival of such material at the opening 56. There will naturally be considerable steam generated from the material being cooked and manholes 58 having covers 58a are arranged to provide access to the interior of the cooker and to permit escape of any excess steam, most of the steam passing upwardly through the openings 42 and 20 to preheat the material as it passes from the mixer.

These shafts 40 and 41 are driven simultaneously and at equal speeds, and the drive is so arranged that the arm 53 and 54 of one shaft pass between heads 55 of the other shaft as the two shafts rotate. It will further be observed that the spacing of the shafts 40 and 41 is such that the heads 55 of one shaft pass close to the other shaft during rotation at the same time they pass the arms of the other shafts. This insures a very highly efficient kneading of the material in the cooker.

In order to drive the cooker and the other elements of this invention the frame 10 supports a main motor 59, which has a pulley 59a mounted on its shaft. On the frame are provided alined end bearings 60 and an intermediate bearing 61. In these bearings is journaled a shaft 62. The shaft 62 forms a jack-shaft and on the left hand end of this shaft is a pinion 65 which meshes with a gear 66 fixed on the shaft 41. Similarly, on the right hand end of the shaft 62 is fixed a pinion 67, which meshes with a gear 68 fixed on the shaft 40. The pinions 65 and 67 are of the same size and the gears 66 and 68 also are of the same size. Consequently the shafts 40 and 41 are rotated in unison.

On the frame are also mounted bearings 63 which carry the driving shaft 64 of a speed reduction drive 69 of any preferred form, the casing only of this drive being here shown. On the shaft 64 is mounted a pulley which is connected by belting 70 to the pulley 59a. By this means the shaft 62 is driven from the motor. On the shaft 64 is also mounted a pulley or sprocket 71 which is connected by belt or chain 72 with a pulley or sprocket 73 mounted on a shaft 74. On this shaft 74 is keyed a clutch member 75 actuated by the lever 76 to engage with and disengage from a clutch member 77 fixed on a shaft 78 which forms the driving shaft for a right angle drive, the casing of which is shown at 79. The purpose of this right angle drive will presently be understood. At the right rear part of the machine there is provided a standard type of variable speed drive, the casing of which is indicated at 80, and this drive receives its power from a motor (not shown). The output shaft of the variable speed drive is indicated at 82 and carries a sprocket 83 which is connected by a suitable sprocket chain such as a roller chain 84 to a sprocket 85 mounted on a shaft 86. This shaft 86 is supported in a bearing 87 carried by the frame end in a stuffing box 88 supported by the end wall 89 of the chamber 57, the stuffing box being disposed axially.

The chamber 57 is provided with a cylindrical casing 90, having a flange 91 at its forward end. On the shaft 86 is mounted a conveyor element in the form of a screw 91a. Thus when the material is fed downward through the opening 56 it is forcibly urged through the chamber 57 by the screw 91a. The chamber 57 leads into an extrusion chamber 92 having a flange 93 at its rear part by which it is connected to the flange 91. The chamber 92 has a cylindrical side wall 94, and at its forward end this chamber is provided with an inwardly extending peripheral flange 95. This cylindrical side wall has at its middle portion a belt of perforations 96, the whole forming a die. Mounted within the chamber 93 is an extrusion head or roller of somewhat less diameter than the interior of the die, the rear face of the roller having preferably a conical face as at 98. The body of the head 97 is of general frusto-conical form but the periphery of this body is slightly concave as at 99.

Supported from the frame 10 is a cylindrical housing 100, which is concentric to the chamber 57 and slightly excentric to the head 97. Within the front end of the housing 100 is supported a combination radial and thrust ballbearing 101 and at the rear end is likewise supported a ball-bearing 102. A dust cap 103 is fitted on the front of the housing 100. In the bearings 101 and 102 is supported a shaft 104 which projects forwardly of the bearing 101 into a roller bearing 105, this roller bearing being spaced from the dust cap 103 and being supported on the frame 10. Between the bearing 105 and dust cap 103 there is provided a hub 106 which is keyed on the shaft 104 and has its inner end provided with a peripheral flange 107 to which is secured a pair of sprocket wheels 108 held to the flange 107 by suitable bolts 109, or the like. The right angle gear 79 has an output shaft 110, whereon is mounted sprockets 111 connected by chain 112 with the sprocket 108.

On the rear end of the shaft 104 (Fig. 9) is an eccentric or crank 113 having a very small throw. This crank carries a ball bearing 114 and a thrust bearing 115 which fit within a cylindrical recess 116 extending into the head 97 from the front face 117 thereof. Surrounding the eccentric 113, the head is provided at its front face with a shallow recess 118 forming an extension of the recess 116 and in this extension 118 is seated a plate 119 which carries a dust ring 120 bearing against a head or closure 121 fixed to the rear end of the housing 100. Extending from the flange 95 are bolts 121a whereon is fitted a dough ring 122 which is pressed against the head 97 by means of springs 123 surrounding the bolts 121a and having their tension regulated by nuts 124. Surrounding the casing 94 is a casing 125 which at its front end has an inwardly projecting flange 126. At 127 is a knife supporting ring which has a lip 128 fitting behind the flange 126. This knife supporting ring is connected by a frame 129 with a ring 130 secured by bolts 131 to the rear sprocket 108. On the flange 95 is also mounted a ring 132 which carries a thin ring 133 extending behind the lip 134 formed on the ring 127.

Secured to the ring 127 and projecting inwardly of the casing 125 is a sleeve 135 through which passes a stem 136 carrying on its inner end a head 137, which is rockingly arranged on the stem and which supports a doctor knife 138 bearing constantly against the peripheral portion of the cylindrical side wall 94. On the stem 136 is fixed an arm 138a to the free end of which is connected one end of a spring 139 (Fig. 10) having its other end connected to a pin 140 carried by the ring 127, so that the knife 138 is constantly urged into contact with the cylindrical surface of side wall 94.

The frame 10 supports a suitably driven blower 16 which communicates through a pipe 142 to the lower part of the casing 125, and tangentially thereof through inlet 142a, so that cool air may be constantly blown into this casing effecting a cooling and drying of the pellets as they are whirled rapidly within the casing 125 so that they will not adhere to each other or to other objects. At the bottom of the casing is an outlet funnel 143 permitting escape of the pellets preferably to apparatus (not shown) where the cooling and drying is continued.

The operation of the mixer, cooker, and auger having been described it will be seen that the cooked material is gradually delivered into the chamber 92. Here, due to the pressing action of the screw, it is forced outwardly of the conical face 98 and into the space between the wall 94 and the hollow peripheral face 99 of the head 97. Now the rotation of the shaft 104 causes the head 97 to perform a planetary movement while the bearing 114 and 115 permit free rotation of the head 97 on the crank or eccentric 113. The effect of this is that the head 97 rolls around the wall 94 compressing the material between the face 99 and the wall 94 and thus forcing this material out causing it to be extruded through the perforations 96. At the same time the ring 130 rotates with the shaft 104, which in turn causes rotation of the ring 127. This ring thus carries the doctor knife 138 around the wall 94 and thus cuts off the extruded material forming pellets which are whirled and cooled by the air blast from the blower casing 141, and pass out through the funnel 143.

A hand wheel 144 is used for adjusting the variable gearing 80, for varying the speed of the screw 91a thereby adjusting the length of the pellets since the speed of the doctor knife remains constant. A lubricating means such as indicated at 145 is provided for admitting lubricant to the recess 116.

What is claimed is:

1. In a continuous machine of the class described, a cooker including an elongated vessel of oblong cross-section, a pair of shafts extending longitudinally through said vessel, T-shaped mixing arms extending from said shafts with the stem portions of the arms fixed to the shafts and the heads of the arms of each shaft positioned between the stems of the arms of the other shaft in longitudinally overlapping relationship when passing, and means to cause rotation of said shafts, certain of the arms of each shaft simultaneously passing closely adjacent the arms of the other shaft to cause a thorough kneading of material in said vessel.

2. In a continuous machine of the class described, a cooker including an elongated vessel of oblong cross-section, a pair of shafts extending longitudinally through said vessel, T-shaped mixing arms extending from said shafts with the stem portions of the arms fixed to the shafts and the heads of the arms of each shaft positioned between the stems of the arms of the other shaft in longitudinally overlapping relationship when passing, the heads on said arms being inclined to form conveyor elements for conveying food material longitudinally of the shafts as they revolve, and means to cause rotation of said shafts, certain of the arms of each shaft simultaneously passing closely adjacent the arms of the other shaft to cause a thorough kneading of material in said vessel.

3. In a machine of the class described, means for cooking a stiff and gummy mass to form dough comprising an elongated enclosure having an aperture in a wall thereof, means for heating the enclosure, and means mounted within said enclosure for kneading and propelling the dough from end to end thereof while being cooked and to force the cooked dough through the aperture in the wall of said enclosure while under the heating influence of said heating means, said kneading and propelling means including a pair of parallel adjacent rotary shafts having interdigitating T-shaped arms the heads of which are adapted to pass in longitudinally overlapping relationship.

THOMAS R. JAMES.